United States Patent
Trehard et al.

(10) Patent No.: US 10,379,542 B2
(45) Date of Patent: Aug. 13, 2019

(54) LOCATION AND MAPPING DEVICE AND METHOD

(71) Applicant: VALEO Schalter und Sensoren GmbH, Bietigheim-Bissingen (DE)

(72) Inventors: Guillaume Trehard, Creteil (FR); Evangeline Pollard, Creteil (FR); Fawzi Nashashibi, Creteil (FR); Benazouz Bradai, Creteil (FR)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 15/506,973

(22) PCT Filed: Aug. 28, 2015

(86) PCT No.: PCT/EP2015/069787
§ 371 (c)(1),
(2) Date: Feb. 27, 2017

(87) PCT Pub. No.: WO2016/034516
PCT Pub. Date: Mar. 10, 2016

(65) Prior Publication Data
US 2017/0261996 A1  Sep. 14, 2017

(30) Foreign Application Priority Data
Sep. 1, 2014 (FR) .................................. 14/01938

(51) Int. Cl.
*G05D 1/02* (2006.01)
*G01S 17/93* (2006.01)

(52) U.S. Cl.
CPC .......... *G05D 1/0274* (2013.01); *G01S 17/936* (2013.01); *G05D 1/024* (2013.01)

(58) Field of Classification Search
CPC .... G05D 1/0274; G05D 1/0088; G05D 1/024; G05D 1/027; G05D 1/0272;
(Continued)

(56) References Cited

U.S. PATENT DOCUMENTS

| 7,211,980 B1 * | 5/2007 | Bruemmer ........... G05D 1/0246 318/567 |
| 2008/0027591 A1 * | 1/2008 | Lenser ................. G05D 1/0251 701/2 |
| 2011/0178669 A1 * | 7/2011 | Tanaka ................. G05D 1/0272 701/25 |

OTHER PUBLICATIONS

International Search Report issued PCT/EP2015/069787, dated Apr. 13, 2016 (2 pages).
(Continued)

*Primary Examiner* — Jelani A Smith
*Assistant Examiner* — Majdi Alsomiri
(74) *Attorney, Agent, or Firm* — Osha Liang LLP

(57) ABSTRACT

The invention relates to a location and mapping device intended for being installed in a mobile vehicle in an environment comprising a plurality of zones, with: a receiving module (11) designed to receive data of the position (d(a)) of obstacles relative to the vehicle; a processing module (12, 14) designed to determine, in accordance with the data received (d(a)) and for a plurality of zones positioned relative to the vehicle, measurement values ($M\_SCAN_{t,i}$) that respectively represent a likelihood of occupation of the zone in question, a likelihood of non-occupation of the zone in question and a likelihood of not knowing the zone in question; a mapping module (18, 20) designed to build, for each zone of said plurality of zones of the environment, values ($M\_GRI_{t,k}$) which respectively represent a likelihood of occupation of the zone in question, a likelihood of non-occupation of the zone in question and a likelihood of not knowing the zone in question; and a
(Continued)

location module (16) designed to determine the position of the vehicle in the environment, which maximizes a measurement of correspondence between the measurement values ($M\_SCAN_{t,i}$) and the built values ($M\_GRI_{t,k}$). The invention also describes an associated method.

10 Claims, 1 Drawing Sheet

(58) Field of Classification Search
CPC ......... G05D 1/0278; G05D 2201/0207; G05D 1/0242; G05D 1/0257; B25J 9/0003; B25J 11/0085; B25J 5/007; B25J 9/161; B25J 9/1666; B25J 9/1697
See application file for complete search history.

(56) References Cited

OTHER PUBLICATIONS

Written Opinion of the International Searching Authority issued in PCT/EP2015/069787, dated Apr. 13, 2016 (8 pages).

\* cited by examiner

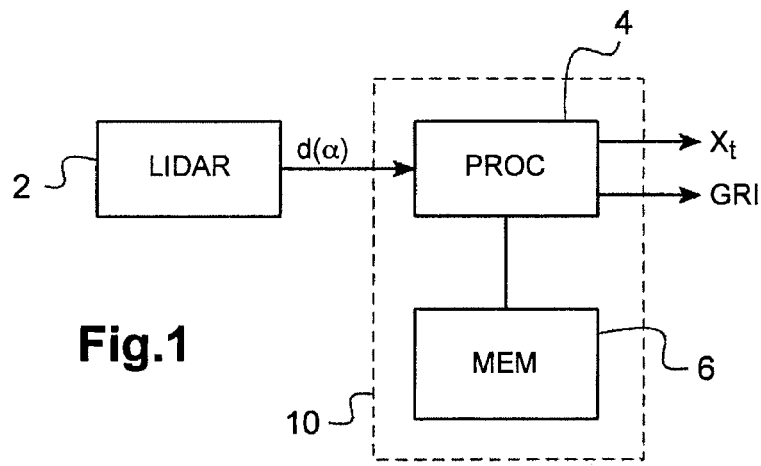
Fig.1
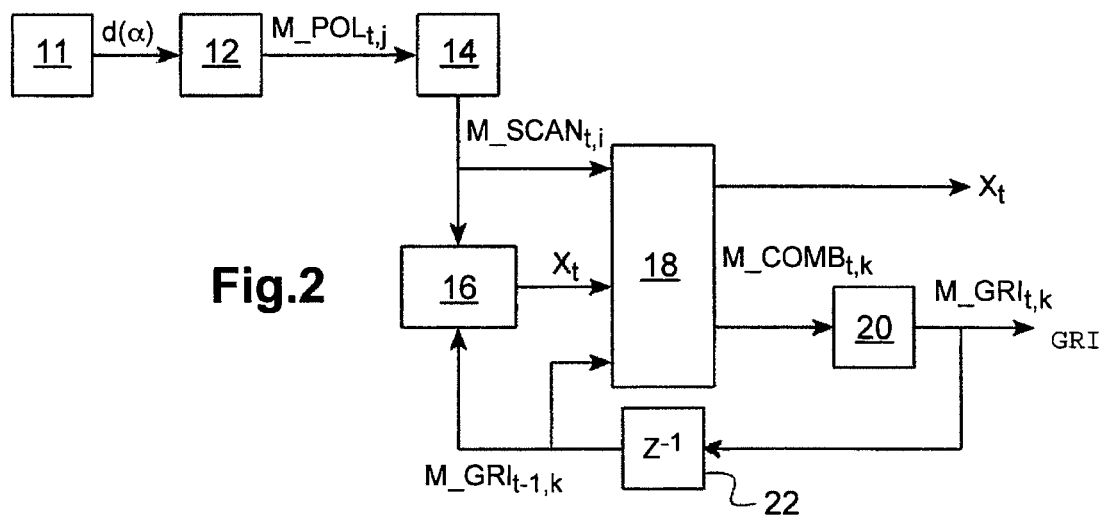
Fig.2
Fig.3
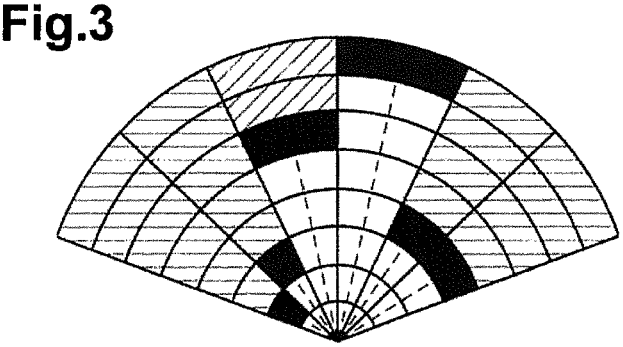

LOCATION AND MAPPING DEVICE AND METHOD

TECHNICAL FIELD TO WHICH THE INVENTION RELATES

The present invention relates to the location and mapping techniques used by a machine which is mobile in an environment.

More particularly, it relates to a location and mapping device and method for fitting to such a mobile machine.

The invention is particularly advantageously applicable in the case in which a sensor delivers positioning data on the positioning of obstacles relative to the mobile machine.

PRIOR ART

There are known location and mapping devices designed to be fitted to a mobile machine (such as a robot), in order to locate the mobile machine in its environment while also producing a map of this environment.

These devices are commonly termed SLAMs, from the English acronym for "Simultaneous Localization and Mapping".

They are usually based on a probabilistic approach. In some solutions, for example, the probability of occupation of each cell of a grid covering the environment is determined as a function of data supplied by a sensor. The article "*Online localization and mapping with moving objects detection in dynamic outdoor environments*", in IEEE 5th International Conference on Intelligent Computer Communication and Processing, 2009, ICCP 2009, 2009, pp. 410-408, may be consulted on this subject.

OBJECT OF THE INVENTION

In this context, the present invention proposes a location and mapping device for fitting to a mobile machine moving in an environment comprising a plurality of areas, with a receiving module designed to receive positioning data on the positioning of obstacles relative to the machine; a processing module designed to determine, as a function of the received data and for a plurality of areas positioned relative to the machine, measurement values representative, respectively, of a probability of occupation of the area concerned, a probability of non-occupation of the area concerned, and a probability of non-knowledge of the area concerned; a mapping module designed to construct, for each area of said plurality of areas in the environment, values representative, respectively, of a probability of occupation of the area concerned, a probability of non-occupation of the area concerned, and a probability of non-knowledge of the area concerned; and a location module designed to determine the positioning of the machine in the environment which maximizes a measurement of a match between the measurement values and the constructed values.

Thus the position of the mobile machine is determined by seeking the best match between the measurement values, generated on the basis of the positioning data received from a sensor at a given instant, and the constructed values, which describe the map produced by the device in the preceding iterations.

However, these values are not limited to the evaluation of the probability of the presence or absence of an obstacle in the various areas of the environment, as in conventional probabilistic approaches, but also allow for the absence of information for some areas, by using the values representative of the probability of non-knowledge of these areas.

It should also be noted that the values representative of the probability of occupation of an area, and of the probability of non-occupation of an area, are also affected by the absence of information for the area concerned, since the aforementioned three representative values (probability of occupation, probability of non-occupation and probability of non-knowledge), termed "masses" in the following description, are usually made to have a fixed sum (usually equal to 1).

According to other characteristics which are optional (and therefore non-limiting):

the location module is designed to determine the match measurement by using a measurement of conflict between the measurement values and the constructed values;

the match measurement is indicative of a match between a spatial distribution of the measurement values representative of the probability of occupation and a spatial distribution of the constructed values representative of the probability of occupation;

the location module is designed to determine the match measurement for a given positioning of the mobile machine, using a sum of terms each of which is associated with a given area of the environment, and to calculate each term by using the product of the measurement value representative of the probability of occupation of the area corresponding to the given area for the given positioning of the machine and the constructed value representative of the probability of occupation of the given area;

the location module is designed to calculate each term by dividing the aforesaid product by a conflict factor using a sum of the measurement value representative of the probability of occupation of the area corresponding to the given area for the given positioning of the machine, multiplied by the constructed value representative of the probability of non-occupation of the given area, and of the measurement value representative of the probability of non-occupation of the area corresponding to the given area for the given positioning of the machine, multiplied by the constructed value representative of the probability of occupation of the given area;

the mapping module comprises a combination module designed to determine for each area, by combining said measurement values relating to the area concerned and values constructed by the mapping module for the area concerned in a preceding iteration, raw values representative, respectively, of a probability of occupation of the area concerned, of a probability of non-occupation of the area concerned, of a probability of non-knowledge of the area concerned, and of a probability of conflict in the area concerned;

the mapping module comprises a normalization module designed to determine said constructed values as a function of said raw values;

the processing module comprises a conversion module designed to determine, for each area of the plurality of areas positioned relative to the machine, said measurement values relating to the area concerned as a function of corresponding values assigned, in a polar grid, to a cell corresponding to the area concerned.

The invention also proposes a system comprising a location and mapping device as mentioned above and a sensor designed to generate said positioning data. This sensor is, for example, a lidar sensor, but it could be another type of sensor, such as a radar sensor.

The invention proposes, in relation to the above, a method of location and mapping used by a machine which is mobile in an environment comprising a plurality of areas, comprising the following steps:

receiving positioning data on the positioning of obstacles relative to the machine;

determining, as a function of the received data and for a plurality of areas positioned relative to the machine, measurement values which are representative, respectively, of a probability of occupation of the area concerned, of a probability of non-occupation of the area concerned, and of a probability of non-knowledge of the area concerned;

constructing, for each area of said plurality of areas of the environment, values which are representative, respectively, of a probability of occupation of the area concerned, of a probability of non-occupation of the area concerned, and of a probability of non-knowledge of the area concerned;

locating the machine, by determining the positioning of the machine in the environment that maximizes a measurement of a match between the measurement values and the constructed values.

This method may if necessary also comprise a step of combining said measurement values relating to the area concerned with values constructed by the mapping module for the area concerned in a preceding iteration, in order to generate raw values representative, respectively, of a probability of occupation of the area concerned, of a probability of non-occupation of the area concerned, of a probability of non-knowledge of the area concerned, and of a probability of conflict in the area concerned.

The optional characteristics described above in relation to the location and mapping device may also be applied to these methods.

DETAILED DESCRIPTION OF AN EXEMPLARY EMBODIMENT

The following description, referring to the attached drawings which are provided by way of non-limiting example, will make the nature and application of the invention clear.

In the attached drawings:

FIG. 1 shows a system comprising a sensor and an example of a location and mapping device according to the invention;

FIG. 2 shows, in functional form, the processes performed by the location and mapping device of FIG. 1;

FIG. 3 shows a polar grid constructed on the basis of the positioning data received from the sensor.

FIG. 1 shows schematically the main elements of a system including a location and mapping device 10.

This system is fitted to a machine which is mobile in an environment, for example a motor vehicle or a robot. As will be apparent from the following description, a system equipped with a location and mapping device, sometimes known as a SLAM (an acronym for the English expression "Simultaneous Localization And Mapping"), can be used simultaneously to locate the system (and therefore the mobile machine) in the environment and to ascertain the map of the environment.

The system of FIG. 1 comprises a sensor 2 which generates positioning data on the positioning (relative to the system) of obstacles present in the environment. The sensor 2 is of the Lidar type, for example; in this case, the positioning data are representative, for a plurality of orientations a relative to a reference direction of the system, of the distance $d(\alpha)$ (from the system) of the first obstacle encountered in the direction associated with this orientation $\alpha$.

In a variant, another type of sensor, such as a radar sensor, could be used.

The system of FIG. 1 also comprises the location and mapping device 10, which receives at its input the positioning data generated by the sensor 2, and generates at its output location information $X_t$ on the system (and therefore on the mobile machine fitted with the system) at each instant t, together with mapping information GRI.

This mapping information GRI is, for example, an occupancy grid (as it is known in English), which describes, in grid form, the locations in the environment in which an obstacle has been detected.

In the case described here, where the environment is mapped in two dimensions, the location information $X_t$ comprises, for example, the coordinates x,y of the system in the mapping plan (more precisely, its horizontal axis x and its vertical axis y) and its heading (as it is known in English) $\theta$. This location information X is determined as described below relative to initial coordinates $x_0$, $y_0$ and an initial heading $\theta_0$ defined by convention (for example, it is assumed that $x_0=0$, $y_0=0$ and $\theta_0=0$).

In order to perform the processes described below, the location and mapping device 10 comprises, in this case, a processor 4 (for example a microprocessor) and a storage means 6 (for example a hard disk).

The processor 4 is designed to perform the processes described below, notably with reference to FIG. 2, for example by the execution of computer program instructions stored in the storage means 6. In a variant, these processes could be performed by an application specific integrated circuit (as it is known in English), or ASIC, embedded in the location and mapping device 10.

The storage means 6 may also be used to store the data used in the processing described below, notably the data representative of probabilities or credibilities, called "masses" in the following text.

FIG. 2 shows, in functional form, the processes performed by the location and mapping device 10 in order to determine the location information $X_t$ and the mapping information GRI on the basis of the positioning data $d(\alpha)$ generated by the sensor 2.

Thus, the different processes performed by the location and mapping device 10 are shown in FIG. 2 as being performed by different modules 11, 12, 14, 16, 18, 20, 22, although these could be performed, in practice, as a result of the execution of instructions by the same processor 4.

The location and mapping device 10 comprises a receiving module 11 which is connected to the sensor 2, and which thus receives the positioning data $d(\alpha)$ generated by the sensor 2 and transmits them to a polar grid construction module 12.

As a function of the positioning data $d(\alpha)$ that it receives at its input at an instant t, the polar grid construction module 12 determines, for each of the cells j of a polar grid, the following three parameters:

an occupation mass $M\_POL_{t,j}(O)$ ("occupation mass" in English);

a non-occupation mass $M\_POL_{t,j}(F)$ ("free mass" in English);

a non-knowledge mass $M\_POL_{t,j}(U)$ ("unknown mass" in English).

For each cell j, the sum of the different masses relating to this cell is equal to 1.

As shown in FIG. 3, a polar grid is a set of cells of the environment (shown in two dimensions here) in which each cell corresponds to a given range of distances from the system (or more precisely from the sensor 2) and to a given angular sector (the angles being measured relative to the aforementioned reference direction of the system).

The occupation mass $M\_POL_{t,j}(O)$ represents the possibility that the cell j concerned in the polar grid is occupied, according to certain information, in this case the positioning data received from the sensor 2 at the instant t. The occupation mass $M\_POL_{t,j}(O)$ is therefore representative of a probability or credibility of occupation of this cell j.

The free mass $M\_POL_{t,j}(F)$ represents the possibility that the cell j concerned in the polar grid is vacant, according to certain information, in this case the positioning data received from the sensor 2 at the instant t. The free mass $M\_POL_{t,j}(F)$ is therefore representative of a probability or credibility of non-occupation of this cell j.

The unknown mass $M\_POL_{t,j}(U)$ represents the possibility that the cell j concerned has not been explored, or in other words that no knowledge is available for this cell j according to the available information (the positioning data in this case). The unknown mass $M\_POL_{t,j}(O)$ is therefore representative of a probability or credibility of non-knowledge of the cell j.

For the cells j located in the angular sector corresponding to a direction θ, the different masses are determined, for example, as follows:

for the cell j (shaded black in FIG. 3) located at a distance $d(\theta)$ from the system (that is to say, if the sensor 2 is a lidar sensor, the cell where an object has been struck by the laser beam shown in dotted lines in FIG. 3), $$M\_POL_{t,j}(O)=I_{CONF}, M\_POL_{t,j}(F)=0, M\_POL_{t,j}(U)=1-I_{CONF},$$

where $I_{CONF}$ is an index of confidence of the sensor 2 (predefined or delivered by the sensor 2, for example), typically in the range from 0.5 to 1;

for the cells j located at a distance which is less than the distance $d(\theta)$ (i.e. those through which the laser beam has passed in the case of a lidar sensor), $$M\_POL_{t,j}(O)=0, M\_POL_{t,j}(F)=I_{CONF}, M\_POL_{t,j}(U)=I_{CONF};$$

for the cells j located at a distance greater than the distance $d(\theta)$ (i.e. those located beyond the impact of the laser beam in the case of a lidar sensor, shown hatched in FIG. 3), $$M\_POL_{t,j}(O)=0, M\_POL_{t,j}(F)=0, M\_POL_{t,j}(U)=1.$$

If the sensor delivers a plurality of positioning data $d(\theta)$ for the same angular sector of the polar grid (for example, if the lidar sensor delivers data for a plurality of heights or layers, or if the resolution of the lidar sensor is finer than that of the polar grid), the smallest distance $d(\theta)$, for example, is chosen for the determination of the masses as described above.

The polar grid construction module 12 transmits all the mass parameters $M\_POL_{t,j}$ thus determined to a conversion module 14 which, for each cell j of the polar grid, assigns the masses determined for this cell j to one (or more) corresponding cell(s) i of a measurement grid in Cartesian coordinates (expressed relative to the current position of the system at the instant t).

In other words, for any $A\in\{O,F,U\}$, $M\_SCAN_{t,i}(A)=M\_POL_{t,j}(A)$ when the cell i of the measurement grid matches the cell j of the polar grid.

Thus, for each cell i of the measurement grid, the following are defined:

an occupation mass $M\_SCAN_{t,i}(O)$ for the cell i, representing the probability (or credibility) of occupation of the cell i (according to the positioning data supplied by the sensor 2 at the instant t);

a free mass $M\_SCAN_{t,i}(F)$ for the cell i, representing the probability of non-occupation of the cell i (according to the positioning data supplied by the sensor 2 at the instant t);

an unknown mass $M\_SCAN_{t,i}(U)$ for the cell i, representing the probability of non-knowledge of the cell i (according to the positioning data supplied by the sensor 2 at the instant t).

For each cell i, the sum of the different masses relating to this cell is equal to 1.

The term "processing module" is here applied to the assembly formed by the polar grid construction module 12 and the conversion module 14. The processing module thus enables the masses $M\_SCAN_{t,i}(A)$ to be determined on the basis of the positioning data $d(\theta)$.

As may be seen in FIG. 2, the different masses $M\_SCAN_{t,i}(A)$ (where $A\in\{O,F,U\}$) produced by the conversion module 16 for the different cells i of the measurement grid are transmitted, on the one hand, to a location module 16, and, on the other hand, to a combination module 18.

The location module 16 also receives at its input the following information, produced by the combination module 18 and the normalization module 20 in the preceding iteration t−1 (as explained below for the current iteration t) and relating to the cells k of a grid representing the environment (in Cartesian coordinates relative to a fixed reference such as the initial location of the system):

for each cell k, an occupation mass $M\_GRI_{t-1,k}(O)$, representing the probability of occupation of the cell k, constructed by the device 10 as a result of the processing performed up to the instant t−1;

for each cell k, a free mass $M\_GRI_{t-1,k}(F)$, representing the probability of non-occupation of the cell k, constructed by the device 10 as a result of the processing performed up to the instant t−1;

for each cell k, an unknown mass $M\_GRI_{t-1,k}(U)$, representing the probability of non-knowledge of the cell k, constructed by the device 10 as a result of the processing performed up to the instant t−1.

It should be noted that this information is not available in the first iteration. However, no processing is required in this first iteration: at this point, the location module 16 simply indicates that the current position (defined by the coordinates x, y and the heading θ) is equal to the aforementioned initial position (defined by the coordinates $x_0$, $y_0$ and the heading $\theta_0$).

For the other iterations, the location module 16 determines the position $X_t$ of the system (and therefore of the mobile machine), defined here by the coordinates x, y and the heading θ, which maximizes a measurement of matching between the values associated with the measurement grid (located relative to the position of the system) and the values associated with the fixed grid representing the environment.

For example, the following measurement is used for this purpose, defined for a position Z by:

$$N(Z) = \sum_k \frac{M\_GRI_{t-1,k}(O) \cdot M\_SCAN_{t,i(k,Z)}(O)}{1 - M_{t,k,Z}(C)}$$

where i(k,Z) is the cell of the measurement grid (positioned relative to the system, i.e. to the mobile machine as mentioned above) corresponding to the cell k of the fixed grid when the system is at position Z, and where $M_{t,k,Z}(C)$ measures the conflict between the information used in the numerator:

$$M_{t,k,Z}(C) = M\_GRI_{t-1,k}(F).M\_SCAN_{t,i(k,Z)}(O) + M\_GRI_{t-1,k}(O).M\_SCAN_{t,i(k,Z)}(F).$$

Thus a match measurement is used which quantifies a match between a spatial distribution (within the cells) of the probabilities of occupation in the measurement grid and a spatial distribution of the probabilities of occupation in the fixed grid.

By using the denominator $(1-M_{t,k,Z}(C))$ it is possible to apply weighting in the sum of the cells for which the information used in the numerator is contradictory, in order to allow for this in an advisable way.

In a variant, it would be possible to use, for each term of the aforementioned sum, another merging operator in order to combine the masses $M\_GRI_{t-1,k}$ received from the combination module 18 (via the normalization module 20) and the masses $M\_SCAN_{t,i(k,Z)}$ received from the conversion module 14, for example a merging operator such as those used in the evidence theory (also called the Dempster-Shafer theory).

In this case, therefore, the value $X_t$ delivered by the location module 16 is the value of Z which maximizes the measurement N(Z): X is such that $N(X) = \max_Z N(Z)$.

This is, for example, determined in practice by calculating the measurement N(Z) for a plurality of positions Z. In the following text, the symbols $z_x$, $z_y$, $z_\theta$ denote, respectively, the horizontal axis, the vertical axis and the heading defining a position Z.

According to a first possible embodiment, the measurement N(Z) is calculated for a (discrete) set of positions Z for which:

$$|z_x - x_{t-1}| \leq S_x, |z_y - y_{t-1}| \leq S_y, |z_\theta - \theta_{t-1}| \leq S_\theta$$

where $x_{t-1}$, $y_{t-1}$, $\theta_{t-1}$ are the horizontal axis, the vertical axis and the heading defining the position $X_{t-1}$ determined in the preceding iteration (or the initial horizontal axis, vertical axis and heading in the iteration t=1), and where $S_x$, $S_y$, $S_\theta$ are predetermined thresholds.

Expressing the coordinates as numbers of intervals of the fixed grid (the cells here being of the same size in the fixed grid and in the measurement grid), or as degrees for the heading, we use, for example, $S_x = S_y = 5$ and $S_\theta = 10°$, and:

$$z_x \in \{x_{t-1}-5; x_{t-1}-4; x_{t-1}-3; x_{t-1}-2; x_{t-1}-1; x_{t-1}; x_{t-1}+1; x_{t-1}+2; x_{t-1}+3; x_{t-1}+4; x_{t-1}+5\}$$

$$z_y \in \{y_{t-1}-5; y_{t-1}-4; y_{t-1}-3; y_{t-1}-2; y_{t-1}-1; y_{t-1}; y_{t-1}+1; y_{t-1}+2; y_{t-1}+3; y_{t-1}+4; y_{t-1}+5\}$$

$$z_\theta \in \{\theta_{t-1}-10°; \theta_{t-1}-8°; \theta_{t-1}-6°; \theta_{t-1}-4°; \theta_{t-1}-2°; \theta_{t-1}; \theta_{t-1}+2°; \theta_{t-1}+4°; \theta_{t-1}+6°; \theta_{t-1}+8°; \theta_{t-1}+10°\},$$

that is to say, a calculation of the measurement N(Z) for 1331 possible positions Z.

According to a second possible embodiment, we use an a priori position $X_{t|t-1} = (x_{t|5-1}, y_{t|t-1}, \theta_{t|t-1})$, derived from the position $X_{t-1}$ determined in the preceding iteration on the basis of a constant speed model:

$$\begin{pmatrix} X \\ \dot{X} \end{pmatrix}_{t|t-1} = \begin{pmatrix} 1 & \Delta t \\ 0 & 1 \end{pmatrix} \cdot \begin{pmatrix} X \\ \dot{X} \end{pmatrix}_{t-1}$$

where $\dot{X}_{t-1}$ is the derivative of the position $X_{t-1}$ at the instant t−1: $\dot{X}_{t-1} = (\dot{x}, \dot{y}, \dot{\theta})_{t-1}$.

The measurement N(Z) can then be calculated for a (discrete) set of positions Z for which:

$$|z_x - x_{t|t-1}| \leq S_x, |z_y - y_{t|t-1}| \leq S_y, |z_\theta - \theta_{t|t-1}| \leq S_\theta$$

where $S_x$, $S_y$, $S_\theta$ are predetermined thresholds.

Expressing the coordinates as numbers of intervals of the fixed grid (the cells here being of the same size in the fixed grid and in the measurement grid), we use, for example, $S_x = S_y = 5$ and $S_\theta = 10°$, and:

$$z_x \in \{x_{t|t-1}-5; x_{t|t-1}-4; x_{t|t-1}-3; x_{t|t-1}-2; x_{t|t-1}-1; x_{t|t-1}; x_{t|t-1}+1; x_{t|t-1}+2; x_{t|t-1}+3; x_{t|t-1}+4; x_{t|t-1}+5\}$$

$$z_y \in \{y_{t|t-1}-5; y_{t|t-1}-4; y_{t|t-1}-3; y_{t|t-1}-2; y_{t|t-1}-1; y_{t|t-1}; y_{t|t-1}+1; y_{t|t-1}+2; y_{t|t-1}+3; y_{t|t-1}+4; y_{t|t-1}+5\}$$

$$z_\theta \in \{\theta_{t|t-1}-10°; \theta_{t|t-1}-8°; \theta_{t|t-1}-6°; \theta_{t|t-1}-4°; \theta_{t|t-1}-2°; \theta_{t|t-1}; \theta_{t|t-1}+2°; \theta_{t|t-1}+4°; \theta_{t|t-1}+6°; \theta_{t|t-1}+8°; \theta_{t|t-1}+10°\},$$

that is to say, a calculation of the measurement N(Z) for 1331 possible positions Z around the a priori position $X_{t|t-1}$ determined on the basis of a constant speed model.

On this subject, reference may be made to the paper "*A real-time robust SLAM for large-scale outdoor environments*" by J. Xie, F. Nashashibi, M. N. Parent and O. Garcia-Favrot, in ITS World Congr. 2010.

The position $X_t$ determined by the location module 16 is transmitted to the combination module 18, which also receives at its input, as mentioned above, the different masses $M\_SCAN_{t,i}(A)$ (where $A \in \{O,F,U\}$) produced by the conversion module 14 for the different cells i of the measurement grid, as well as the different masses $M\_GRI_{t-1,k}(A)$ (where $A \in \{O,F,U\}$) produced as explained above by the normalization module 20 in the preceding iteration t−1 for the cells k of the fixed grid.

The combination module 18 then combines the information supplied by the sensor 2 at the instant t (represented by the masses $M\_SCAN_{t,i}(A)$) and the information constructed by the device 10 up to the instant t−1 (represented by the masses $M\_GRI_{t-1,k}(A)$), in order to deduce therefrom raw masses $M\_COMB_{t,k}(A)$ representative of the state of knowledge of the fixed grid at the instant t, for example by applying to each cell k of the fixed grid a formula of the following type:

$$M\_COMB_{t,k} = M\_GRI_{t-1,k} \; \boxed{\cap} \; M\_SCAN_{t,i(k,X_t)}$$

where $i(k,X_t)$ is the cell of the measurement grid which corresponds to cell k of the fixed grid when the system is at the position $X_t$, and where $\boxed{\cap}$ is a conjunction operator defined, for example, in the paper "*Credibilist occupancy grids for vehicle perception in dynamic environments*" by J. Moras, V. Cherfaoui and P. Bonnifait, in IEEE Int. Conf. Robot. Automat. (ICRA2011), pages 84-89, 2011.

Making explicit the calculations performed as a result of this operator $\boxed{\cap}$, we thus obtain, for each cell k:
a raw occupation mass $M\_COMB_{t,k}(O)$, representing the probability of occupation of the cell k, here found by:

$$M\_COMB_{t,k}(O) = M\_GRI_{t-1,k}(O).M\_SCAN_{t,i(k,X_t)}(O) + M\_GRI_{t-1,k}(U).M\_SCAN_{t,i(k,X_t)}(O) + M\_GRI_{t-1,k}(O).M\_SCAN_{t,i(k,X_t)}(U);$$

a raw free mass M_COMB$_{t,k}$(F), representing the probability of non-occupation of the cell k, here found by:

M_COMB$_{t,k}$(F)=M_GRI$_{t-1,k}$(F).M_SCAN$_{t,i(k,Xt)}$(F)+
M_GRI$_{t-1,k}$(U).M_SCAN$_{t,i(k,Xt)}$(F)+M_GRI$_{t-1,k}$
(F).M_SCAN$_{t,i(k,Xt)}$(U);

a raw unknown mass M_COMB$_{t,k}$(U), representing the probability of non-knowledge of the cell k, here found by:

M_COMB$_{t,k}$(U)=M_GRI$_{t-1,k}$(U).M_SCAN$_{t,i(k,Xt)}$(U);

a raw conflict mass M_COMB$_{t,k}$(C), representing a probability of conflict regarding this cell k (between the information delivered by the sensor 2 and the information constructed by the device 10 up to the instant t−1), here found by:

M_COMB$_{t,k}$(C)=M_GRI$_{t-1,k}$(F).M_SCAN$_{t,i(k,Xt)}$(O)+
M_GRI$_{t-1,k}$(O).M_SCAN$_{t,i(k,Xt)}$(F).

For each cell k, the sum of the different raw masses relating to this cell is equal to 1.

The raw masses M_COMB$_{t,k}$ produced by the combination module 18 are transmitted to the normalization module 20 which retains (in each cell) the distribution of the occupation, free and unknown masses, but causes the concept of a conflict mass to disappear, providing freedom from mobile obstacles. According to a feasible embodiment, the raw conflict masses M_COMB$_{t,k}$(C) for the different cells k may be stored for use in detecting mobile obstacles.

The normalization module 20 thus calculates the following masses (after normalization):

M_GRI$_{t,k}$(A)=M_COMB$_{t,k}$(A)/(1−M_COMB$_{t,k}$(C)) for
any A∈{O,F,U} and for all the cells k.

Thus, for each cell k, we obtain an occupation mass M_GRI$_{t,k}$(O), a free mass M_GRI$_{t,k}$(F) and an unknown mass M_GRI$_{t,k}$(U), which in this case form the mapping information GRI delivered by the device 10. Because of the normalization, for each cell k, the sum of the different masses M_GRI$_{t,k}$(O), M_GRI$_{t,k}$(F), M_GRI$_{t,k}$(U) relating to this cell is equal to 1.

The term "mapping module" is here applied to the assembly formed by the combination module 18 and the normalization module 20.

This information may then be represented, for example, on a map (displayed, for example, on a screen on the mobile machine), if necessary showing each cell k in a color defined as a function of the masses M_GRI$_{t,k}$(O), M_GRI$_{t,k}$(F), M_GRI$_{t,k}$(U) relating to this cell k; for example, for a cell k, use is made of a color whose trichromatic coordinates in the RGB reference frame are:

M_GRI$_{t,k}$(O), M_GRI$_{t,k}$(F), M_GRI$_{t,k}$(U).

As mentioned above, the masses M_GRI$_{t,k}$ produced at the output of the normalization module 20 are transmitted (through an iteration delay device 22) to the location module 16 and to the combination module 18 for use in the next iteration.

The invention claimed is:

1. A location and mapping device to be fitted to a machine which is mobile in an environment comprising a plurality of areas, the device comprising:
  a receiving module designed to receive positioning data on the positioning of obstacles relative to the machine;
  a processing module configured to determine, as a function of the received data, and for a plurality of areas positioned relative to the machine, measurement values which are representative, respectively, of a probability of occupation of the area concerned, of a probability of non-occupation of the area concerned, and of a probability of non-knowledge of the area concerned;
  a mapping module configured to construct, for each area of said plurality of areas of the environment, values which are representative, respectively, of a probability of occupation of the area concerned, of a probability of non-occupation of the area concerned, and of a probability of non-knowledge of the area concerned; and
  a location module configured to determine the positioning of the machine in the environment that maximizes a measurement of a match between the measurement values and the constructed values,
  wherein the location module is configured to:
    determine the match measurement for a given positioning of the mobile machine, using a sum of terms each of which is associated with a given area of the environment,
    calculate each term by using the product of the measurement value representative of the probability of occupation of the area corresponding to the given area for the given positioning of the machine and the constructed value representative of the probability of occupation of the given area, and
    calculate each term by dividing the aforesaid product by a conflict factor using a sum of the measurement value representative of the probability of occupation of the area corresponding to the given area for the given positioning of the machine, multiplied by the constructed value representative of the probability of non-occupation of the given area, and of the measurement value representative of the probability of non-occupation of the area corresponding to the given area for the given positioning of the machine, multiplied by the constructed value representative of the probability of occupation of the given area.

2. The location and mapping device as claimed in claim 1, wherein the location module is configured to determine the match measurement by using a measurement of conflict between the measurement values and the constructed values.

3. The location and mapping device as claimed in claim 1, wherein the match measurement is indicative of a match between a spatial distribution of the measurement values representative of the probability of occupation and a spatial distribution of the constructed values representative of the probability of occupation.

4. The location and mapping device as claimed in claim 1, wherein the mapping module comprises a combination module configured to determine for each area, by combining said measurement values relating to the area concerned and values constructed by the mapping module for the area concerned in a preceding iteration, raw values representative, respectively, of a probability of occupation of the area concerned, of a probability of non-occupation of the area concerned, of a probability of non-knowledge of the area concerned, and of a probability of conflict in the area concerned.

5. The location and mapping device as claimed in claim 4, wherein the mapping module comprises a normalization module configured to determine said constructed values as a function of said raw values.

6. The location and mapping device as claimed in claim 1, wherein the processing module comprises a conversion module configured to determine, for each area of the plurality of areas positioned relative to the machine, said measurement values relating to the area concerned as a function of corresponding values assigned, in a polar grid, to a cell corresponding to the area concerned.

7. A system comprising:
- a location and mapping device as claimed in claim 1; and
- a sensor configured to generate said positioning data.

8. The system as claimed in claim 7, wherein the sensor is a lidar sensor.

9. A method of location and mapping used by a machine which is mobile in an environment comprising a plurality of areas, comprising:
- receiving positioning data on the positioning of obstacles relative to the machine;
- determining, as a function of the received data and for a plurality of areas positioned relative to the machine, measurement values which are representative, respectively, of a probability of occupation of the area concerned, of a probability of non-occupation of the area concerned, and of a probability of non-knowledge of the area concerned;
- constructing, for each area of said plurality of areas of the environment, values which are representative, respectively, of a probability of occupation of the area concerned, of a probability of non-occupation of the area concerned, and of a probability of non-knowledge of the area concerned; and
- locating the machine, by determining the positioning of the machine in the environment that maximizes a measurement of a match between the measurement values and the constructed values,
- wherein locating the machine comprises:
  - determining the match measurement for a given positioning of the mobile machine, using a sum of terms each of which is associated with a given area of the environment,
  - calculating each term by using the product of the measurement value representative of the probability of occupation of the area corresponding to the given area for the given positioning of the machine and the constructed value representative of the probability of occupation of the given area, and
  - calculating each term by dividing the aforesaid product by a conflict factor using a sum of the measurement value representative of the probability of occupation of the area corresponding to the given area for the given positioning of the machine, multiplied by the constructed value representative of the probability of non-occupation of the given area, and of the measurement value representative of the probability of non-occupation of the area corresponding to the given area for the given positioning of the machine, multiplied by the constructed value representative of the probability of occupation of the given area.

10. The method as claimed in claim 9, further comprising combining, for each area of the environment, said measurement values relating to the area concerned with values constructed by the mapping module for the area concerned in a preceding iteration, in order to generate raw values representative, respectively, of a probability of occupation of the area concerned, of a probability of non-occupation of the area concerned, of a probability of non-knowledge of the area concerned, and of a probability of conflict in the area concerned.

* * * * *